United States Patent [19]

Nagashima et al.

[11] Patent Number: 5,537,673
[45] Date of Patent: Jul. 16, 1996

[54] CAR STEREO HAVING A REMOVABLE PANEL

[75] Inventors: Akira Nagashima; Tadao Nuka, both of Saitama-ken, Japan

[73] Assignee: Pioneer Electronic Corporation, Tokyo, Japan

[21] Appl. No.: 490,644

[22] Filed: Jun. 15, 1995

Related U.S. Application Data

[63] Continuation of Ser. No. 64,550, May 20, 1993, abandoned.

[30] Foreign Application Priority Data

May 25, 1992 [JP] Japan ............................. 4-157502
Nov. 10, 1992 [JP] Japan ............................. 4-324963

[51] Int. Cl.[6] ............................................. H04B 1/06
[52] U.S. Cl. .................. 455/346; 455/351; 455/74; 455/89
[58] Field of Search ............................ 455/74, 89, 345, 455/348, 346, 90, 347, 351; 340/539, 426; 379/58–59, 63, 433, 440; 381/86

[56] References Cited

U.S. PATENT DOCUMENTS

| | | | |
|---|---|---|---|
| 4,287,599 | 9/1981 | Goncharoff et al. | 455/77 |
| 5,077,832 | 12/1991 | Szczutkowski et al. | 455/89 |
| 5,107,244 | 4/1992 | Minamide et al. | 455/348 |
| 5,239,700 | 8/1993 | Guenther et al. | 455/345 |
| 5,276,728 | 1/1994 | Pagliaroli et al. | 340/539 |

FOREIGN PATENT DOCUMENTS

| | | | |
|---|---|---|---|
| 0461572 | 12/1991 | European Pat. Off. | 455/345 |
| 0483956 | 5/1992 | European Pat. Off. | 455/345 |
| 3726784 | 2/1989 | Germany | 455/345 |

*Primary Examiner*—Reinhard J. Eisenzopf
*Assistant Examiner*—Andrew Faile
*Attorney, Agent, or Firm*—Nikaido, Marmelstein, Murray & Oram

[57] ABSTRACT

A removable panel has a plurality of operation buttons for operating a car stereo. A cellular telephone system operated by the operation buttons is provided in the panel. A controller is provided in the panel for rendering the car stereo inoperative in response to an instruction received through the cellular telephone system.

7 Claims, 15 Drawing Sheets

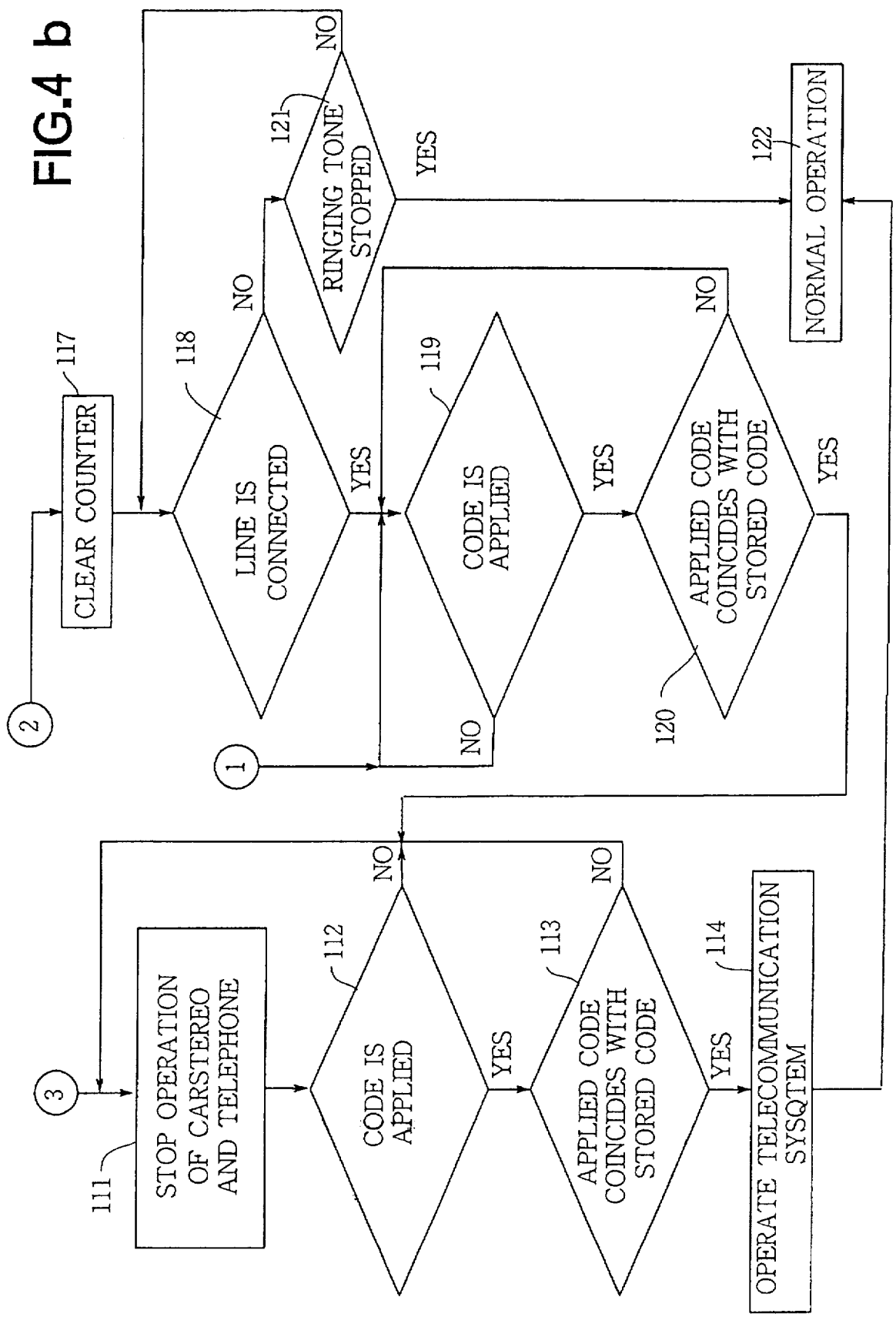

5,537,673

CAR STEREO HAVING A REMOVABLE PANEL

This application is a continuation of application Ser. No. 08/064,550 filed May 20, 1993 abandoned.

FIELD OF THE INVENTION

The present invention relates to a car stereo provided with a removable panel, and more particularly to a car stereo provided with a telecommunication system.

BACKGROUND OF THE INVENTION

Increase in the use of a sophisticated car stereo in recent years has caused an increase in theft of these stereos. In order to prevent the theft of the stereo, there has been many proposals. In accordance with one of the proposals, a removable panel having a plurality of push buttons for control of the stereo is attached to the body of the stereo.

FIG. 15 shows the above described prior art. The car stereo comprises a car stereo body 10 and a removable panel 20 attached to the body 10. The body 10 has recessed panel 11 mounted at the front thereof. The panel 11 has a cassette opening 14. A detector switch 15 is provided on an upper left hand side of the panel 20 to mechanically detect the attachment of the panel 20 on the body 10. A connector 12 which is connected to a connector 21 (FIG. 16) provided at the back of the panel 20 when the panel is attached, are formed on the panel 11. The panel 20 has a cassette opening 24 which coincides with the cassette opening 14 of the body 10 and various operation keys 22. A display 23 is disposed at a central portion of the panel 20 so as to indicate information such as current time and the received frequency of the stereo.

Referring to FIG. 16 the connector 12 of the body 10 has a 5 V supply terminal 12a, data input/output terminal 12b, 8 V supply terminal 12c, and ground terminal 12d. The terminals 12a and 12c are connected to a 5 V supply circuit 17 and an 8 V supply circuit 18, respectively. The data input/output terminal 12b is connected to a microcomputer 19. The microcomputer 19 is connected to the detector switch 15 so as to be operated in accordance with the operating state of the switch 15.

The connector 21 of the panel 20 has terminals which correspond to the terminals 12a to 12d of the connector 12. Namely, there is provided a 5 V input terminal 21a, data input/output terminal 21b, 8 V input terminal 21c, and ground terminal 21d. The terminal 21a is connected to a microcomputer 25 so as to supply a 5 V voltage thereto. The microcomputer 25 receives data from the microcomputer 19 through the data input/output terminals 12b and 21b dependent on the operation of the operation keys 22 on the panel 20, such as the time and the frequency of the radio. The microcomputer 25 applies a control signal to a display driver 26 to indicate the received data on the display 23. The 8 V input terminal 21c is connected to a lamp 27 for lighting the display 23.

When the panel 20 is attached to the body 10, the terminals 21a to 21d of the connector 21 are connected to the respective terminals 12a to 12d of the connector 12. Accordingly, the 5 V supply circuit 17 and the 8 V supply circuit 18 are connected to the microcomputer 25 and the lamp 27, respectively, thereby operating them. The microcomputer 25 is applied with various data from the microcomputer 19 through the terminals 12b and 21b, so that, the microcomputer 25 operates to drive the display 23, thereby indicating information on the display 23.

On the contrary, when the panel 20 is detached, the detector switch 15 is opened. The microcomputer 19 stops feeding the data to the microcomputer 25. Thus the display 23 of the panel 20 does not show information.

When the panel 20 is removed from the stereo body 10, the stereo body 10 does not have the appearance of a car stereo. Hence, if the driver takes the panel 20 with him when leaving the vehicle, the theft of the car stereo is prevented.

However, since the panel detached from the stereo body 10 is utterly useless and hence will only be a hindrance, the driver is often reluctant to carry the panel around.

SUMMARY OF THE INVENTION

An object of the present invention is to provide a car stereo having a removable panel wherein the panel is provided with a transmitter device so that the driver will voluntarily take the panel when leaving the car.

According to the present invention there is provided a car stereo having a removable panel attached to a body of the car stereo, the panel having a plurality of operation buttons for operating the car stereo, comprising a cellular telephone system provided in the panel, a battery provided in the panel for operating the cellular telephone system, control means provided in one of the car stereo body and the panel for rendering the car stereo inoperative in response to an instruction received through the cellular telephone system.

In an aspect of the invention, the cellular telephone system is operated through the operation buttons of the panel. The panel has a display for displaying conditions of the car stereo, and the panel has a display driver for displaying operation of the cellular telephone.

The other objects and features of this invention will become understood from the following description with reference to the accompanying drawings.

DETAILED DESCRIPTION OF THE PREFERRED EMBODIMENTS

Figure 15:
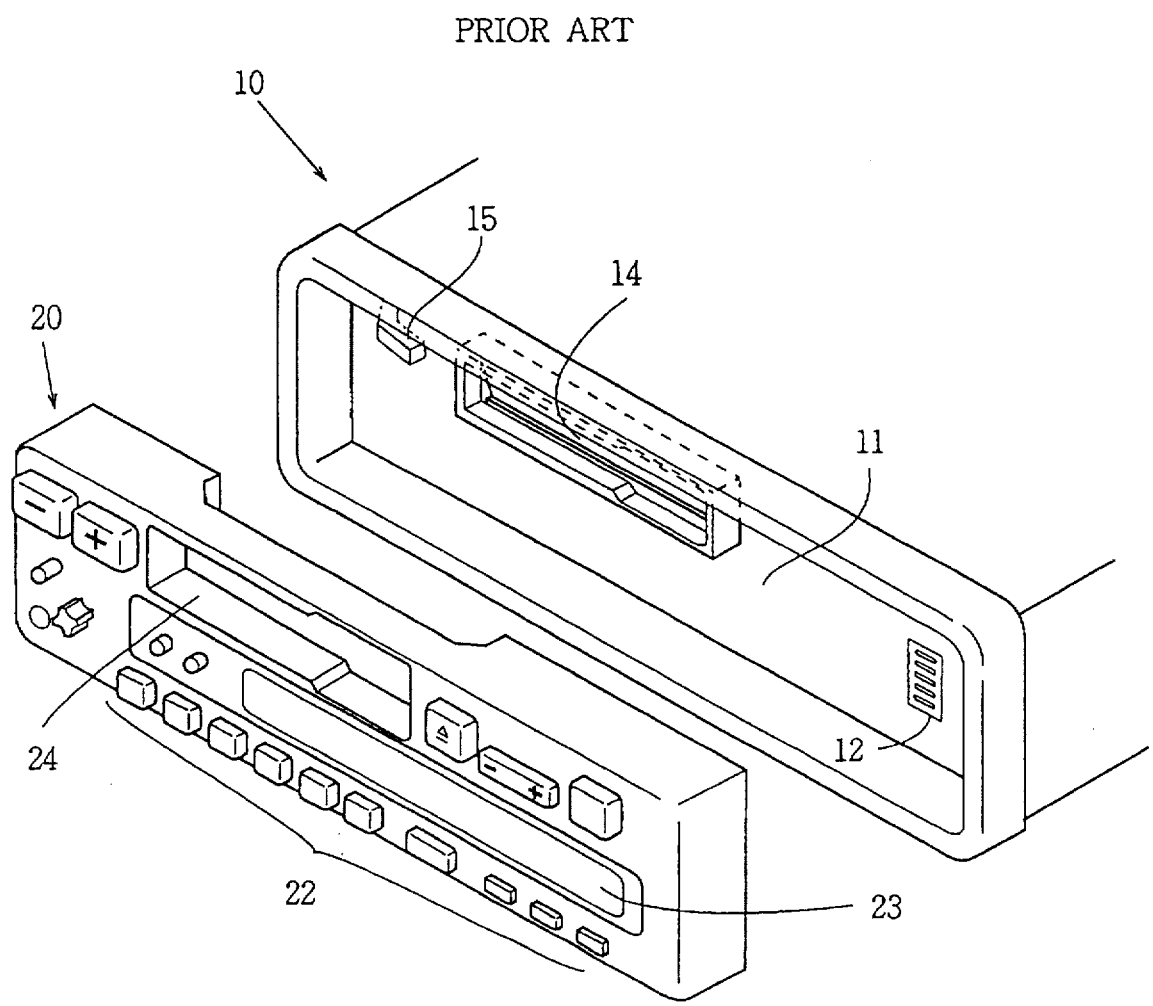
FIG. 15 is a perspective view of a conventional car stereo having a removable panel.
Figure 16:
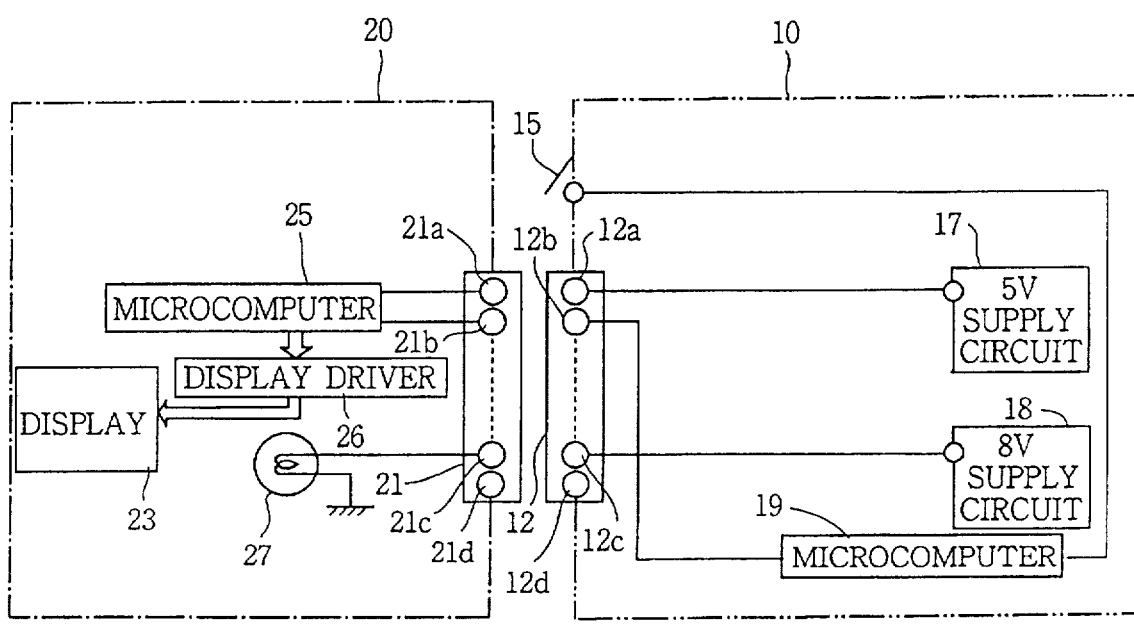
FIG. 16 is a block diagram of a control circuit provided in a body and a panel of the conventional car stereo.

A car stereo according to the present invention is described hereinafter. The same parts in FIGS. 1 to 3 as those of FIGS. 15 and 16 are identified by the same references as in FIGS. 15 and 16 so that the further descriptions thereof are omitted.

Figure 1:
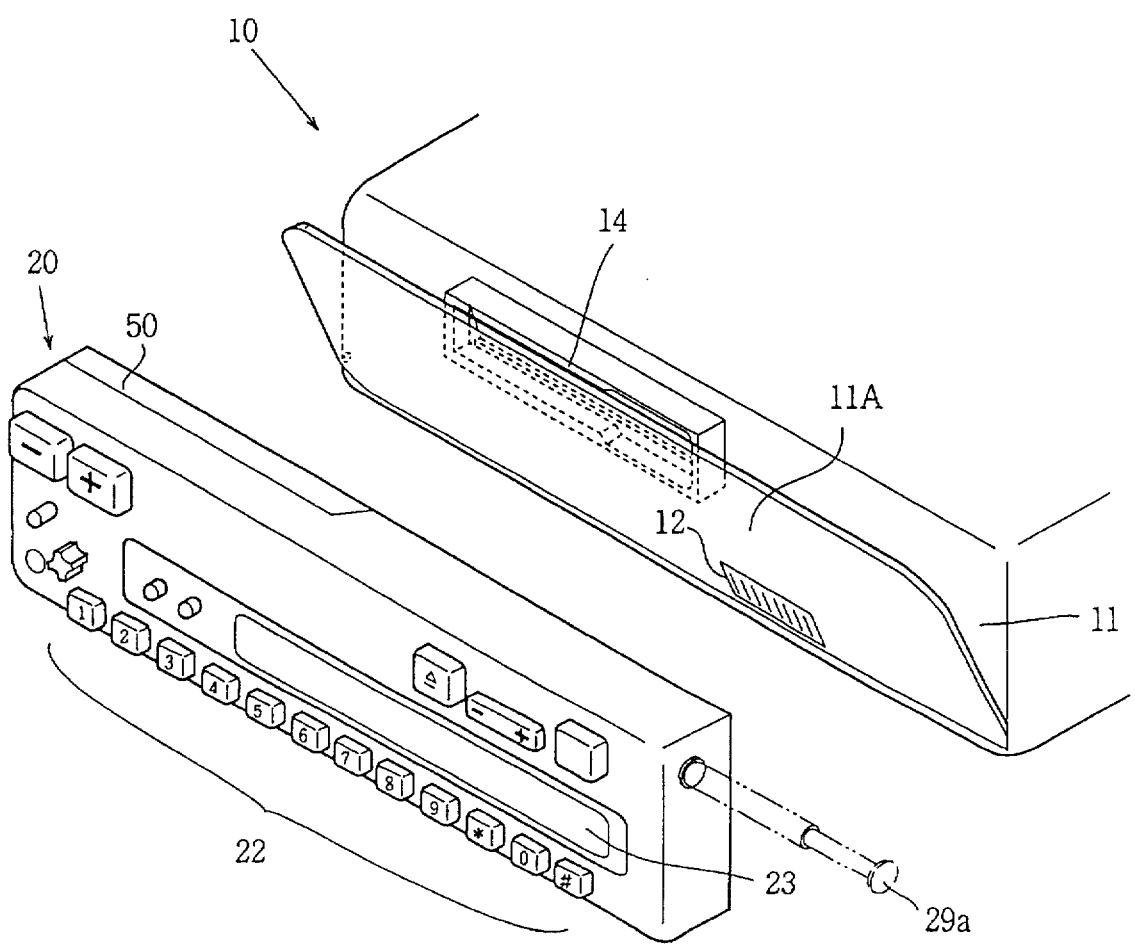
FIG. 1 is a perspective view of a car stereo of the present invention having a removable panel.

Referring to FIG. 1, the car stereo has a car stereo body 10 and a removable panel 20 provided with a telecommunication system. The body 10 has the cassette opening 14 and a flap 11A having the connector 12. The flap 11A is rotatably connected to the front lower edge of the front panel 11 so as to be downwardly opened.

The panel 20 which serves as a cellular portable telephone as a radio telephone is provided with a telescopic rod antenna 29a projectable from the side of the panel 20. The operation buttons 22 under the display 23 are numbered so as to be used as push buttons for the telephone.

Figure 2:
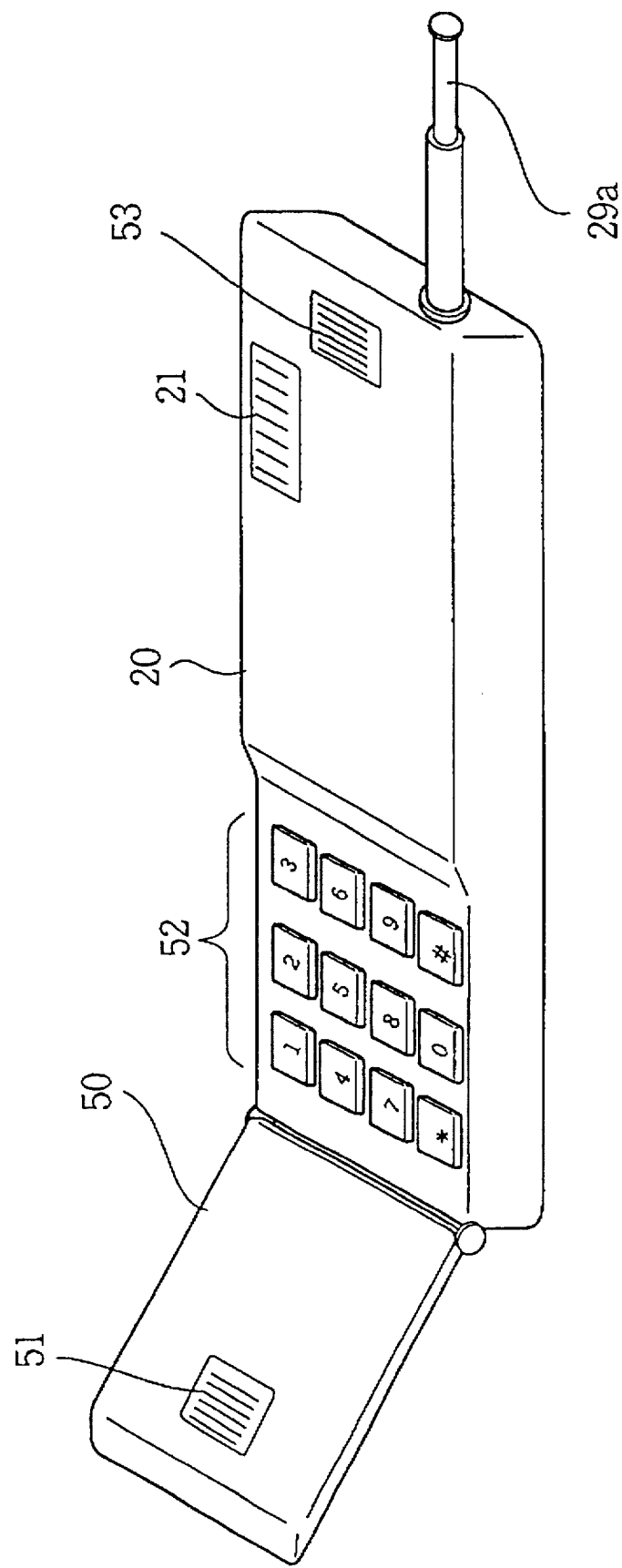
FIG. 2 is a perspective view of the removable panel of the car stereo of FIG. 1.

As shown in FIG. 2, on the back of the panel are formed the connector 21 which is connected to the connector 12 of the flap 11A when attached to the body 10, and a speaker 53. The panel 20 further has a recess wherein a matrix of numbered push buttons 52 for the telephone are provided. The push buttons 52 are covered by a lid 50 which is pivotally connected to a side edge of the panel 20. A microphone 51 is formed on the lid 50, facing the push buttons 52.

Figure 3:
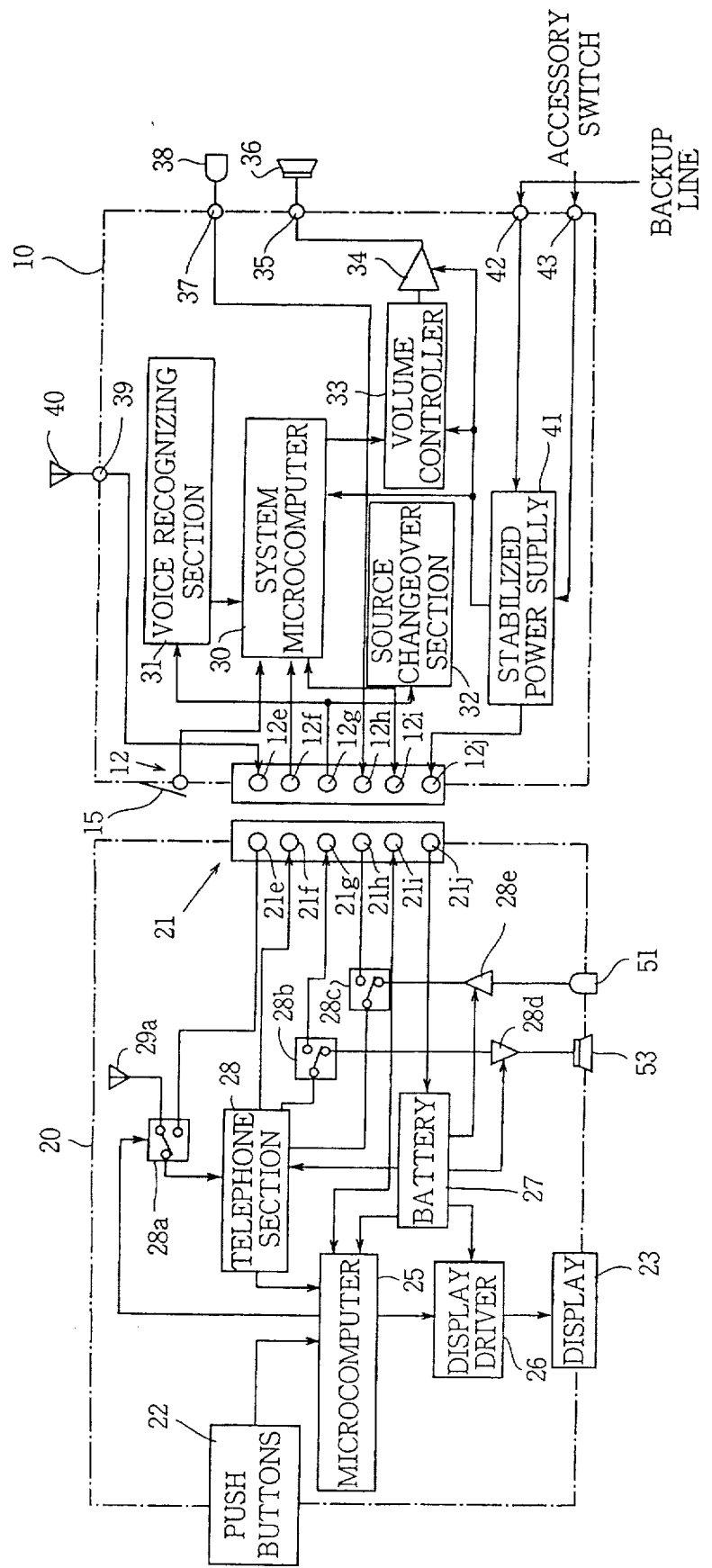
FIG. 3 is a block diagram of a control circuit provided in a body and the panel of the car stereo.

Referring to FIG. 3, the control circuit provided in the car stereo body 10 has a stabilized power supply 41 which is connected to a backup line and an accessory switch of the car through external input terminals 42 and 43, respectively. The stabilized power supply 41 is connected to a system microcomputer 30, volume controller 33 and an amplifier 34. The system microcomputer 30 is applied with signals from the detector switch 15, voice recognizing section 31, and from the panel 20 through the connectors 12 and 21 and accordingly applies signals to the volume controller 33 and to the panel. For example, when a call signal is fed from the panel 20 to the microcomputer 30, the volume controller 33 is operated to attenuate audio signals applied from a source changeover section 32 to a speaker 36 through the amplifier 34 and an external output terminal 35. Thus the volume of sound generated by the speaker 36 is decreased to a predetermined level when using the telephone. The source changeover section 32 is connected to the panel 20, CD player, cassette player and a tuner of the car stereo. The voice recognizing section 31 is provided for recognizing a predetermined instruction applied through an outside line for controlling the car stereo, the operation of which will be later described.

The control circuit in the panel 20 has a battery 27 which is connected to the stabilized power supply 41 provided in the car stereo body 10 through accessory line and terminals 21j and 12j of the connectors 21 and 12, respectively, so as to be charged whenever the panel 20 is attached to the body 10. The battery 27 is connected to the microcomputer 25, which applies data to the system microcomputer 30 in the body 10 through terminals 12i and 21i of the connectors 12 and 21, respectively, in accordance with the operation of the operation buttons 22 on the front or the push buttons 52 in the back of the panel 20. The system computer 30 accordingly applies data to the microcomputer 25, thereby to indicate the data on the display 23 through the display driver 26.

The control circuit has a telephone section 28 to which the call signal is selectively transmitted through the rod antenna 29a of the panel 20 or an antenna 40 provided on the automobile through a changeover switch 28a. Namely, the changeover switch 28a is controlled by the microcomputer 25 so as to be operated to connect the telephone section 28 with the antenna 29a or with the antenna 40 through terminals 21e and 12e and an external input terminal 39. The call signal is applied to the system microcomputer 30 through terminals 21f and 12f.

The telephone section 28 is also selectively connected through a changeover switch 28b to the speaker 53 of the panel 20 through an amplifier 28d and to the speaker 36 provided in the automobile through the source changeover section 32. The telephone section 28 is further connected through a changeover switch 28c to the microphone 51 through an amplifier 28e and to a microphone 38 mounted in the body 10 through terminals 21g, 12g, and an external input terminal 37. The changeover switches 28b and 28c are controlled by the microcomputer 25 so that the telephone can be used either with the panel in user's hand or attached to the body 10. The power is supplied to the amplifiers 28d and 28e and the display driver 23 from the battery 27.

The operation of the present invention is described hereinafter.

In order to use the telephone from the automobile, the panel 20 may either be attached to or detached from the car stereo body 10. When the system microcomputer 30 in the body 10 detects that the panel is attached in accordance with the operation of the detector switch 15, the microcomputer 30 supplies data to the microcomputer 25 in the panel 20 through the terminals 12h and 21h. Meanwhile, the microcomputer 25 is connected with the stabilized power supply 41 through the battery 27. The microcomputer 25 operates the changeover switches 28a, 28b, and 28c to connect the telephone section 28 with the antenna 40, speaker 36 and the microphone 38, respectively. When a call button (not shown) provided on the panel 20 is depressed, or the operation buttons 22 are operated to input a predetermined code, the telephone section 28 is rendered operative. When a dial tone is heard over the speaker 36, the operation buttons 22 are operated to call a desired number. Thus the conversation is carried out through the microphone 38 and the speaker 36.

The telephone call can also be made from the automobile with the panel detached. Upon detecting that the panel 20 is detached from the car stereo body 10, the system microcomputer 30 stops supplying data to the microcomputer 25. The microcomputer 25 is then supplied with the power charged in the battery 27. The microcomputer 25 operates the changeover switches 28a, 28b and 28c to connect the telephone section 28 with the antenna 29a, the speaker 53 and the microphone 51, respectively, as shown in FIG. 3. The call button (not shown) is operated to render the panel in a phone mode. The dial tone is heard through the speaker 53, and the user opens the lid 50 and operates the push buttons 52 to make a call. Hence, the conversation over the telephone is carried out through the speaker 53 and the microphone 51.

When a call signal is applied from an outside telephone to the telephone section 28 through the antenna 40, the call signal is fed to the system microcomputer 30. The system microcomputer 30 accordingly operates the volume controller 33 to mute the sound of whatever is being played on the car stereo. Thus, when the panel is detached, and the call button is depressed to answer the call, a conversation can be carried out without the sound from the car stereo interfering.

When leaving the vehicle, the driver detaches the panel 20 from the car stereo body 10 and takes it with him. The driver can use the panel 20 as a portable telephone in the same manner as described above outside of the automobile. Without the panel 20, it becomes difficult to recognize the car stereo. Hence the theft of the car stereo can be prevented. Furthermore, since there is a use for the panel 20, the driver is likely to take the trouble of carrying the panel.

Figure 4:
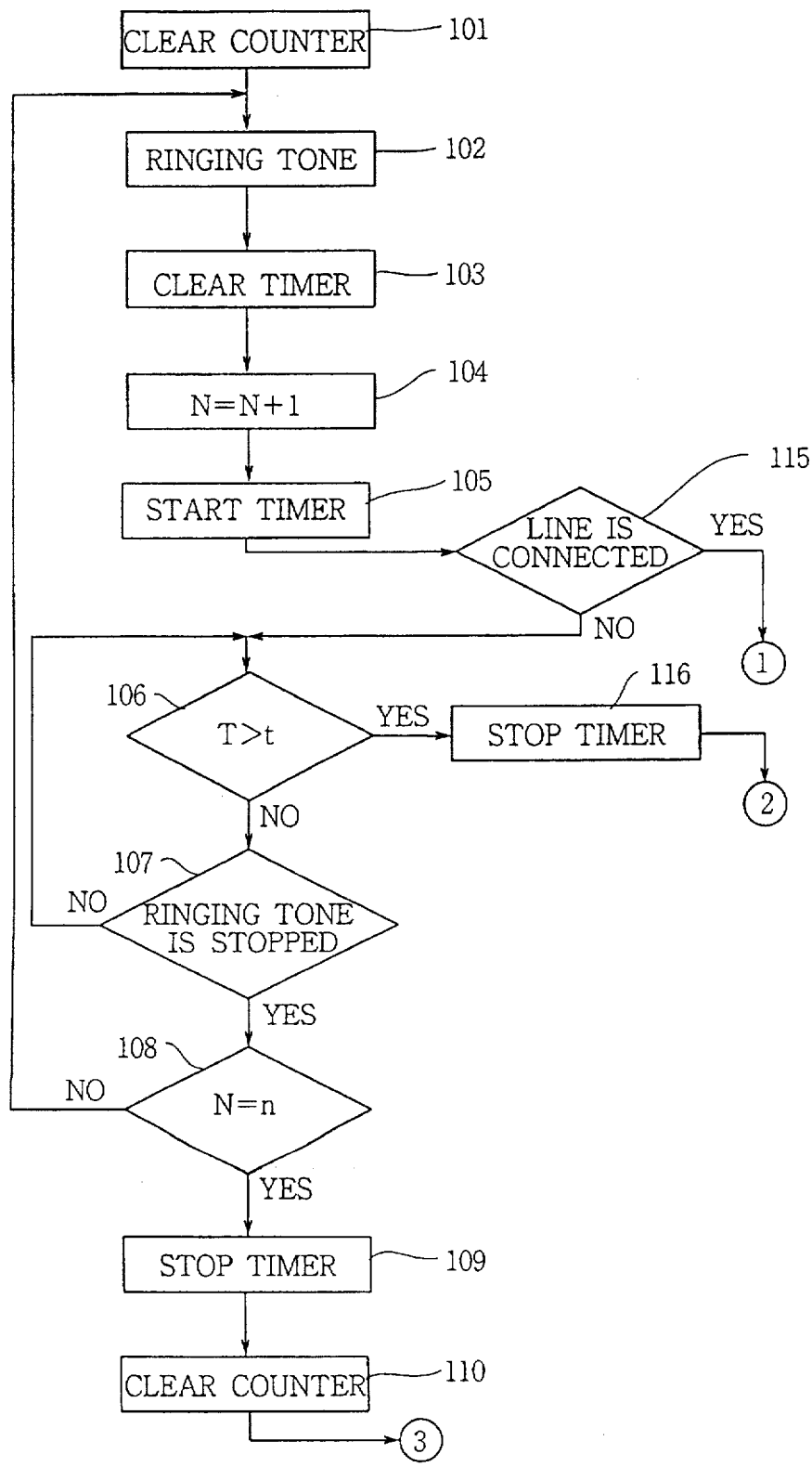
FIGS. 4a and 4b show a flowchart describing the operation of the present invention.

The car stereo of the present invention is further provided with a system for rendering the car stereo inoperative when actually stolen, the operation of which is described hereinafter with reference to FIGS. 4a and 4b.

When the owner neglects to take the panel with him when leaving the automobile, the car stereo may be stolen with the panel. In such a case, the owner calls the telephone in his car stereo from a pay phone or from a home phone. When a call signal is applied to the system microcomputer 30 through the antenna 40 and the telephone section 28, a counter provided in the system microcomputer 30 is cleared at a step 101. With the first ringing tone at a step 102, a timer provided in the system microcomputer 30 is cleared at a step 103. The counter is count up at a step 104 and the timer is started at a step 105. The steps 102 to 105 is repeated until it is detected at steps 106 to 108 that the present time T measured by the timer has reached a predetermined time t or the count N of the counter representing the number of the ringing tone has reached a predetermined number n, or the ringing tone has stopped. More particularly, the owner keeps ringing the telephone in the car stereo n times within the time t. Thereafter, the program goes to a step 109 where the timer is stopped and to a step 110 where the counter is cleared.

At a step 111, the system microcomputer 30 in the car stereo body 10 stops supplying data to the microcomputer 25 in the panel so that the car stereo cannot function even though the operation buttons 22 are operated. At the same time, the telephone is rendered inoperative.

If the thief picks up the panel 20 in response to the ringing tone after the timer is started at the step 105, the program goes from a step 115 where it is determined that the line is connected, to a step 119. The owner calling from the outside line consecutively operates push buttons or a dial to apply a predetermined code to the system microcomputer 30 through the telephone section 28. The code is assigned to the car stereo and stored in a ROM in the system microcomputer. When it is determined that a code is applied to the system microcomputer 30 at the step 119, the applied code is compared with a code stored in the ROM which is stored when the car stereo is manufactured, or compared with a code in a RAM of the system microcomputer 30 which is stored by the owner. When the codes coincide with each other (step 120), the program goes to the step 111 where the car stereo and the telephone are rendered inoperative.

If the ringing tone is continued for the predetermined long time t, the program goes from the step 106 to a step 116 where the timer is stopped. The counter is cleared at a step 117. When the line is connected by this time (step 118), the owner operates the buttons of the telephone which he is using to input the predetermined code. Thereafter, the program proceeds from the step 118 to the steps 119, 120 and 111 as described hereinbefore.

When the line is kept disconnected after the time t, the program goes from the step 118 to a step 121 where it is determined that the ringing tone is stopped. Thereafter, the program goes to a step 122 where the car stereo returned to the normal operation state.

In order to render the car stereo and the telephone operative after the car stereo is restored to the owner, the operation buttons 22 on the panel 20 are consecutively operated to input a predetermined code which is assigned to each stereo as an identification code and stored in the ROM of the system microcomputer 30. The code may be stored in the RAM of the system microcomputer 30 by the owner. Therefore, at a step 112, it is determined that code is applied to the microcomputer 30. Thereafter, the input code is compared with the code stored in the ROM or the RAM at a step 113. When the codes coincide, program goes to a step 114 where the telecommunication system of the panel 20 is restored and to the step 122 where the operation of the car stereo is resumed.

The car stereo may be provided with other transmitting devices such as a radio transmitter instead of the telephone.

The antitheft system may be modified so as to indicate a warning on the display 23 of the panel 20, or to keep on generating a large alarm sound by operating the panel, when the code for rendering the car stereo inoperative is transmitted. Alternatively, the microcomputer 25 of the panel 20 may be operated to contact the police.

Furthermore, a voice signal may be used instead of the code. In order to render the car stereo inoperative, the owner pronounces a word or a code corresponding to the stored voice signal which is fed to the voice recognizing section 31 provided in the car stereo body 10. When the voice recognizing section 31 recognizes the word or code, the system microcomputer 30 is operated to stop the operation of the car stereo and the telephone. The voice recognizing section 31 may be provided in the panel 20.

Figure 5:
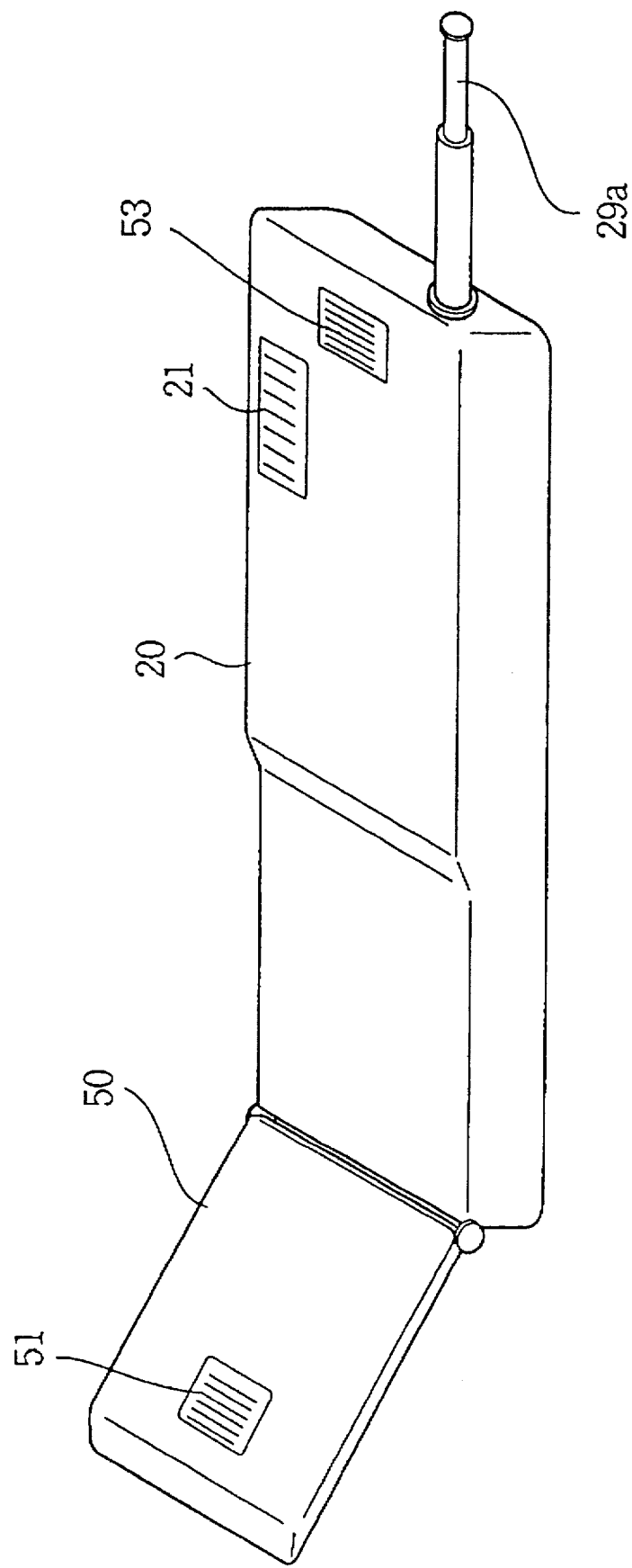
FIG. 5 is a perspective view of a removable panel of a second embodiment of the present invention.

In the second embodiment of the present invention, the push buttons 52 provided on the panel 20 is omitted as shown in FIG. 5, so that the telephone is used by operating the buttons 22. Moreover the display 23 is operated to indicate appropriate data when in the phone mode.

Figure 6:
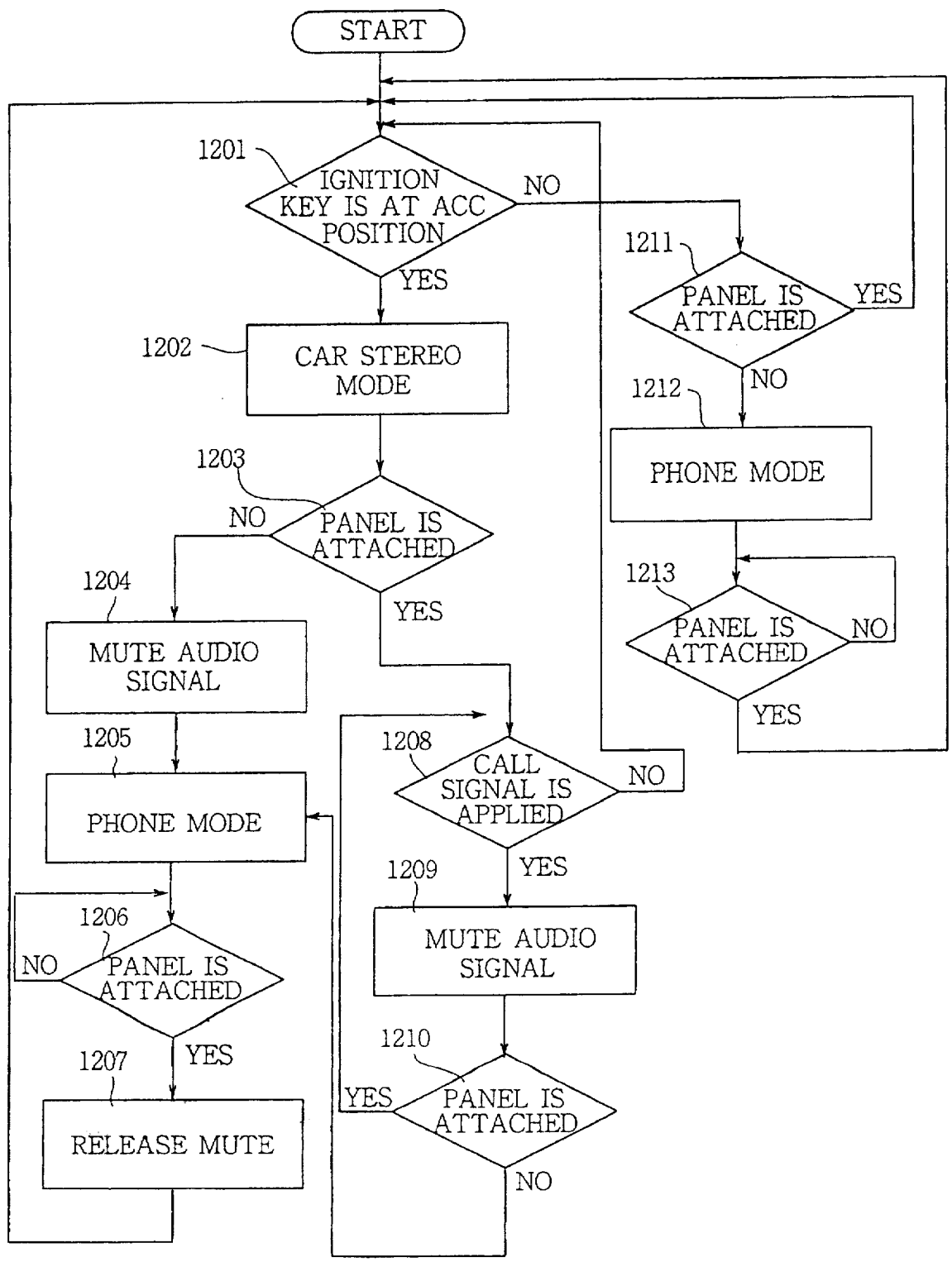
FIG. 6 is a flowchart showing the operation for changing the operation mode of push buttons, provided in the panel of FIG. 5.

The operation with the buttons 22 is described hereinafter with reference to FIG. 6. When an ignition key of the automobile is turned to the accessory (ACC) position, the program goes from a step 1201 to a step 1202 where the operation of the operation buttons 22 is in a car stereo mode. When the panel 20 is detached from the car stereo body 10 at a step 1203, the volume controller 33 (FIG. 3) in the car stereo body 10 is operated to mute the audio signals applied from either the tuner, CD player or the cassette player at a step 1204, so that a conversation may be easily heard over the telephone. Thereafter, the mode of the operation buttons 22 are changed into a phone mode at a step 1205. The buttons 22 or the call button of the panel 20 is depressed to operate the telephone section 28 in the panel, and the buttons 22 is operated to call a desired number, thereby enabling to use the panel 20 as a telephone.

The phone mode is maintained until a step 1206 determines that the panel 20 is attached to the car stereo body 10. Thereafter, muting of the audio signals is revoked at a step 1207. The program returns to the steps 1201 and 1202 so that the push buttons are again in the car stereo mode.

On the other hand, if it is determined at the step 1203 that the panel 20 is attached, and at a step 1208 that a call signal is transmitted, the audio signals are muted at a step 1209. When the call is answered by picking up the panel 20 and depressing the call button, the program proceeds from a step 1210 to the step 1205, where the buttons 22 are rendered in the phone mode. When there is no call signal, the program returns from the step 1208 to the step 1201.

When the ignition key is not turned to the ACC position, the car stereo is inoperative and the telephone can be used only to make a call. The program proceeds from the step 1201 to a step 1211 where it is determined whether the panel 20 is attached to the car stereo body 10. When the panel is detached for making a call, the buttons 22 on the panel are operated in the phone mode (step 1212) until the panel is attached (step 1213). Whenever the panel 20 is attached to the body 10, the program returns to the step 1201 from the step 1211 or from the step 1213.

Figure 7:
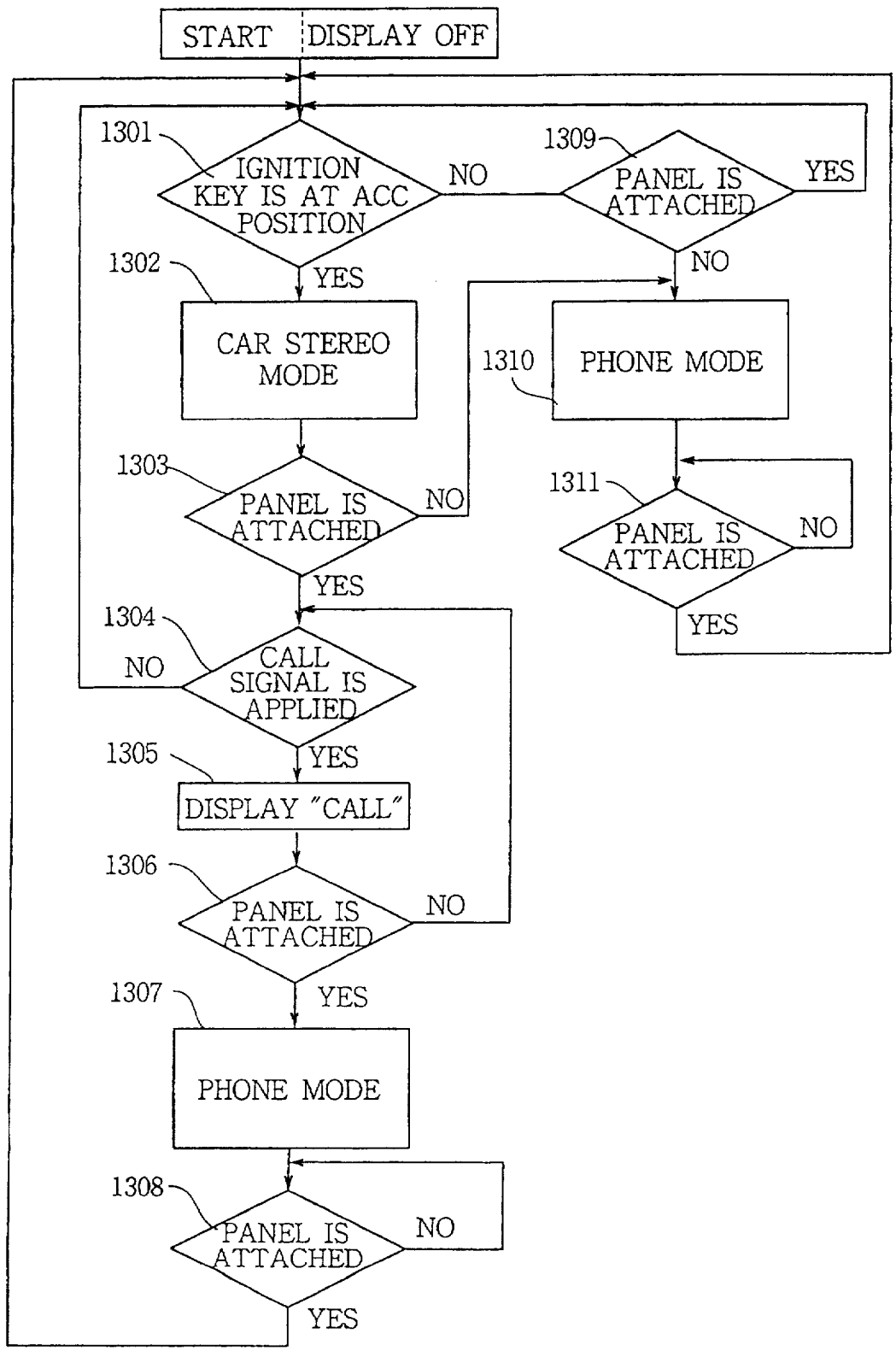
FIG. 7 is a flowchart showing the operation for changing the operation mode of a display provided in the panel of FIG. 5.
Figure 8:
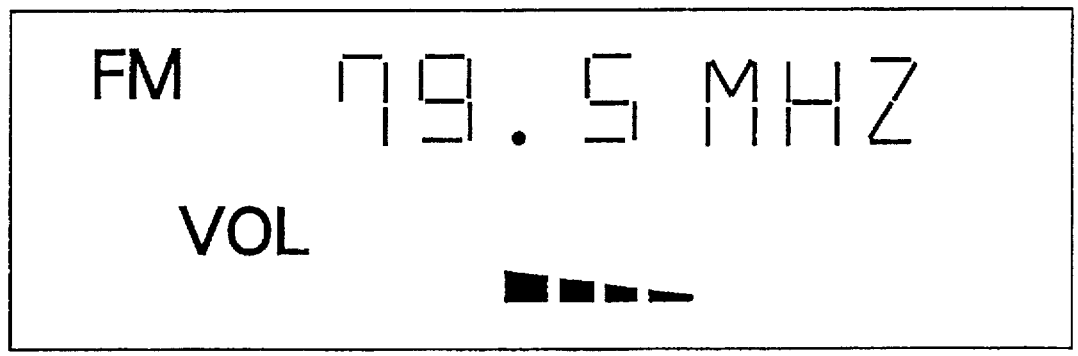
FIG. 8 is an illustration of the display in a car stereo mode.
Figure 9:
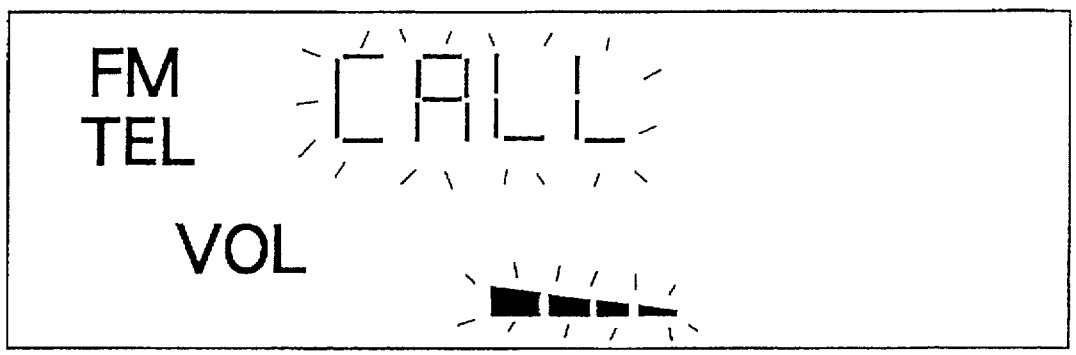
FIG. 9 is an illustration of the display when receiving a call.

FIG. 7 shows the operation for setting the operation mode of the display 23. At the start of the operation, the display 23 is turned off. When the ignition key is turned to the ACC position, the program goes from a step 1301 to a step 1302 where the display 23 is operated to be in a car stereo mode, thereby indicating such information as the received frequency as shown in FIG. 8. When there is a call (step 1304) while the panel 20 is kept attached (step 1303), the display 23 flashes letters "CALL" as shown in FIG. 9 (step 1305). When the panel 20 is detached from the car stereo body 10 to take the call, the operation of the display 23 is changed to a phone mode (step 1307). When the conversation over the telephone is finished so that the panel 20 is attached to the body 10 (step 1308), the program returns to the step 1301.

Figure 10:
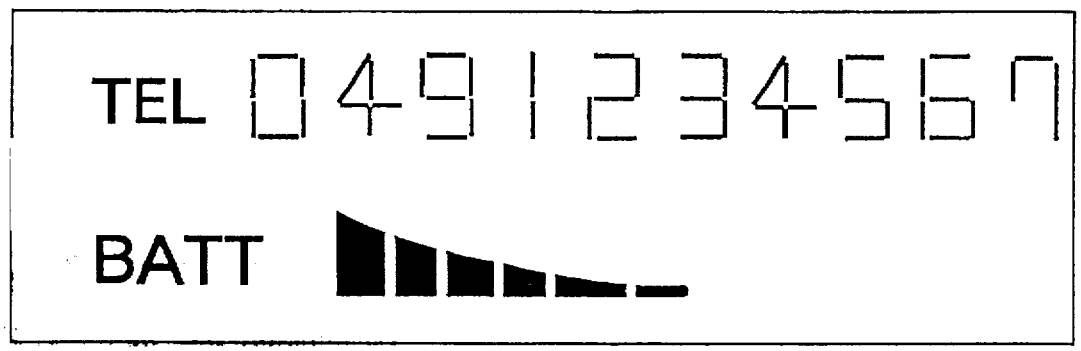
FIG. 10 is an illustration of the display in a phone mode.
Figure 11:
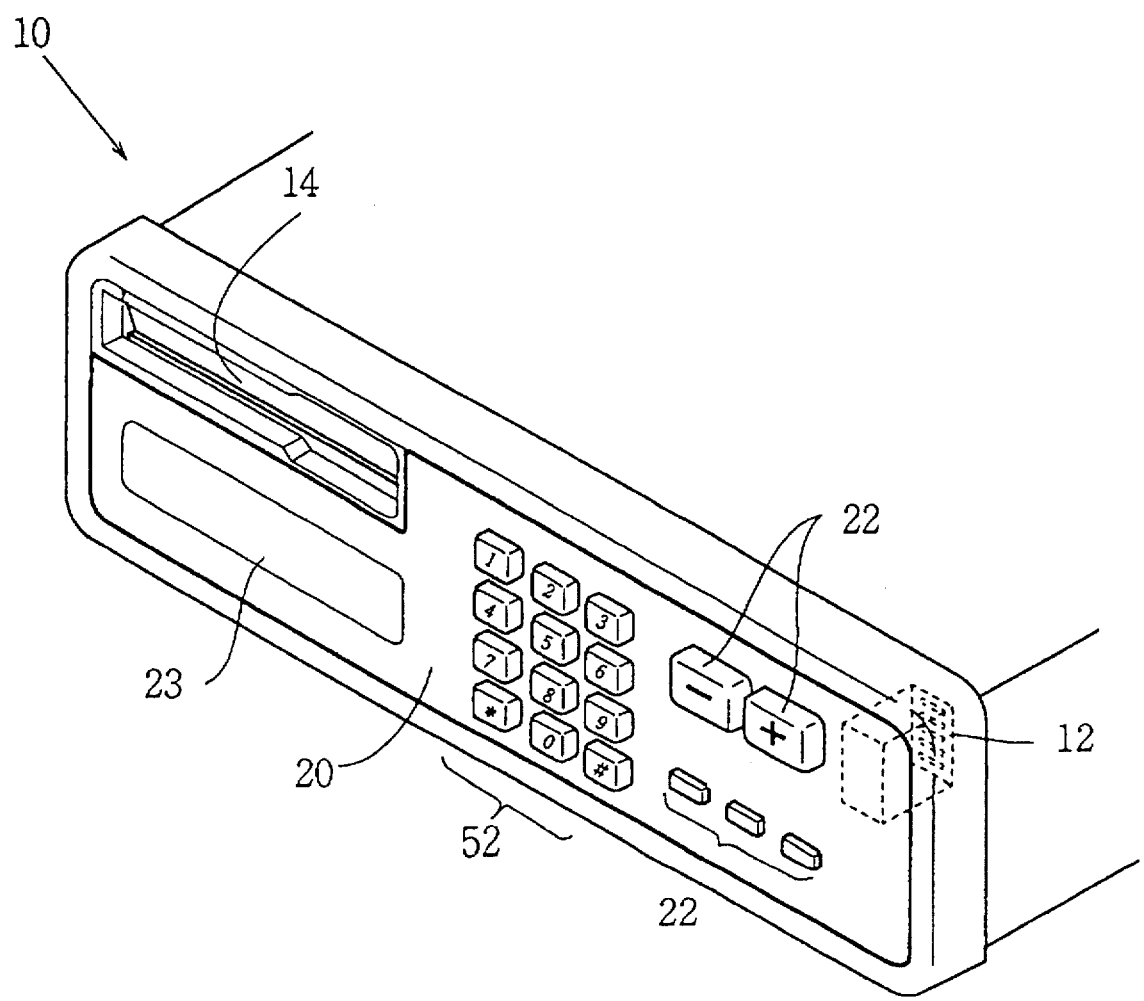
FIG. 11 is a perspective view of a modification of the car stereo of the present invention.

When it is determined at the step 1303 that the panel 20 is detached in order to make a call from the automobile, the program goes to a step 1310 where the operation of the display 23 is changed to the phone mode. When the operation buttons 22 are pushed to call a desired number, the number is indicated on the display 23 as shown in FIG. 10. After the panel 20 is attached at a step 1311, the program returns to the step 1301.

When the ignition key is not operated, the program goes from the step 1301 to a step 1309 to determine the condition of the panel 20. If the panel is detached, the display 23 is in the phone mode, thereby allowing to make a phone call. Whenever the panel 20 is attached, the program returns from steps 1308, 1309 and 1311 to the step 1301 and to the step 1302, thereby maintaining the display 23 in the car stereo mode until the panel 20 is detached.

Namely, in the present embodiment, the panel 20 attached to the body 10 can receive a call provided the ignition key is at ACC position. On the other hand, in order to make a call, the panel 20 must be detached from the body 10. The operation for rendering the car stereo and the telephone inoperative is the same as in the first embodiment.

Figure 12:
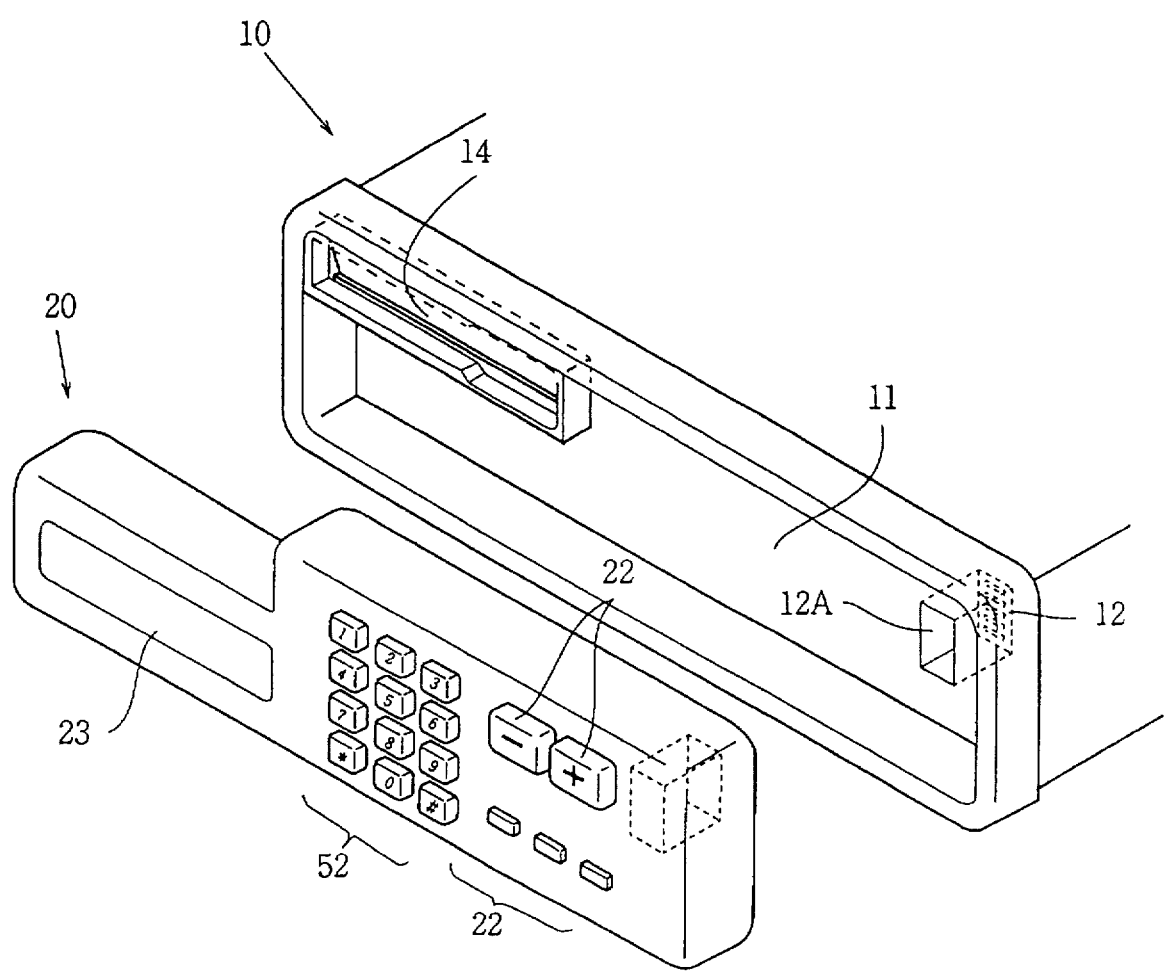
FIG. 12 is a perspective view of the car stereo of FIG. 11 when a removable panel is detached.
Figure 13:
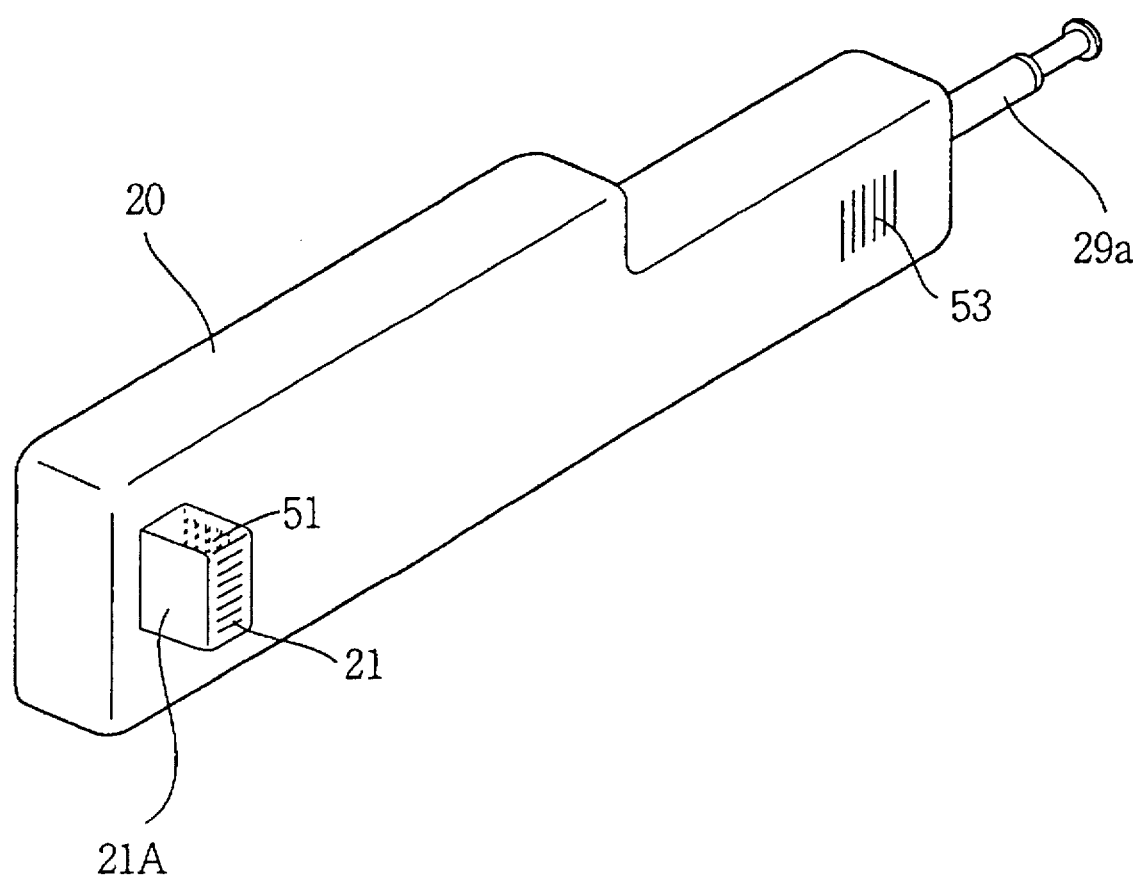
FIG. 13 is a perspective view of the removable panel of FIG. 12.

FIGS. 11 to 15 show various modifications of the car stereo. In the car stereo shown in FIGS. 11 to 13, the cassette opening 14 is formed at the upper left hand corner of the front panel 11. The panel 20 is so cut away in a shape that the opening 14 is kept apparent when the panel 20 is attached to the car stereo body 10. As shown in FIGS. 12 and 13 the connector 12 of the car stereo body 10 is disposed in a recess 12A and the connector 21 is disposed in a projection 21A where the microphone 53 is also provided. Other constructions and the operations are roughly the same as the second embodiment.

Figure 14:
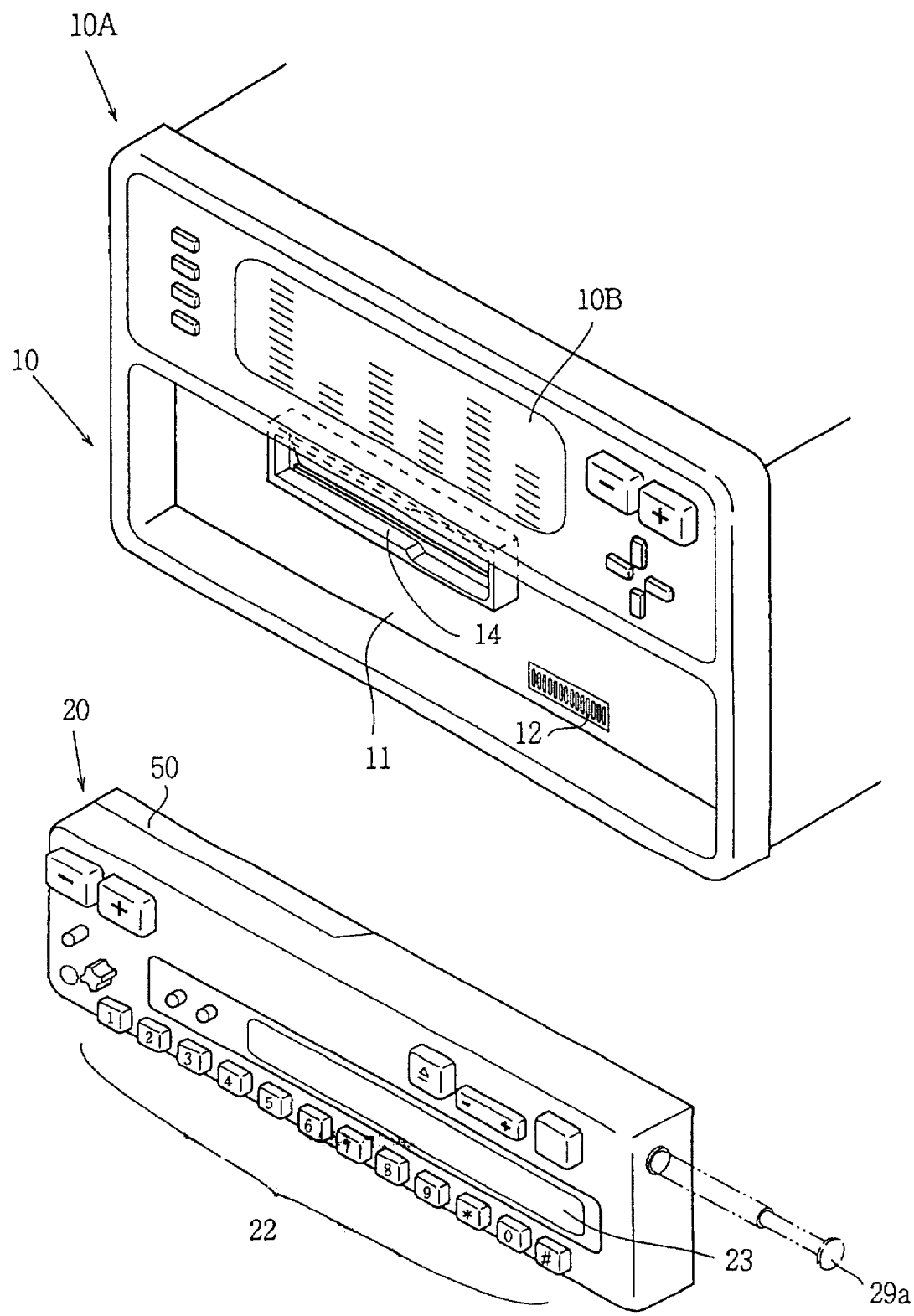
FIG. 14 is a perspective view of another modification of the car stereo of the present invention.

Referring to FIG. 14, a component car stereo system is provided with an equalizer 10A having a spectrum analyzer display 10B. The panel 20 is attached to a recessed panel 11 under the equalizer 10A.

From the foregoing it will be understood that the present invention provides a car stereo having a removable panel where the panel can be used as a portable cellular telephone. Thus the mounting operation is simplified than when independently mounting both the car stereo and the telephone. In addition, since the telephone can be used outside of the automobile, the owner will be likely to carry the panel when leaving the automobile, thereby reducing the possibility of the theft. Furthermore, since the car stereo can be rendered inoperative when actually stole, the theft is further prevented.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A car stereo having a removable panel attached to a body of the car stereo provided in an automobile, the panel having a plurality of operation buttons for selecting a frequency received by the car stereo, the car stereo comprising:

a radio telephone system provided in the panel, the radio telephone system having an antenna and a telephone section;

a battery provided in the panel for operating the radio telephone system; and control means, provided in one of the car stereo body and the panel, for rendering the car stereo into a disabled state in response to an instruction received through the radio telephone system, in the disabled state the car stereo cannot be operated even though the operation buttons are operated therein preventing theft of the car stereo.

2. The car stereo according to claim 1 wherein the radio telephone system is operated through the operation buttons of the panel.

3. The car stereo according to claim 1 wherein the panel has a display for displaying conditions of the car stereo, the panel has a display driver for displaying operation of the radio telephone.

4. The car stereo according to claim 1 further comprising a detector means for detecting removing the panel, and operating means responsive to the detected removal of the panel for rendering the telephone system operative.

5. The car stereo according to claim 1 further comprising muting means responsive to a received telephone call for muting sound of the car stereo.

6. A car stereo having a removable panel attached to a body of the car stereo provided in an automobile, the panel having a plurality of operation buttons for selecting a frequency received by the car stereo, the car stereo comprising:

a radio telephone system provided in the panel, the radio telephone system having an antenna and a telephone section;

the plurality of operation buttons for selecting a frequency received by the car stereo to be used as push buttons for the radio telephone system;

a battery provided in the panel for operating the radio telephone system; and control means, provided in one of the car stereo body and the panel, for rendering the car stereo into a disabled state in response to an instruction received through the radio telephone system, in the disabled state the car stereo cannot be operated even though the operation buttons are operated therein preventing theft of the car stereo.

7. A car stereo according to claim 1, wherein said plurality of operation buttons for selecting a frequency received by the car stereo are also used as push buttons for the radio telephone system.

* * * * *